May 1, 1923.
LE ROY P. CLUTTER
COUPLING DEVICE
Filed Feb. 5, 1921
1,453,922
2 Sheets-Sheet 1
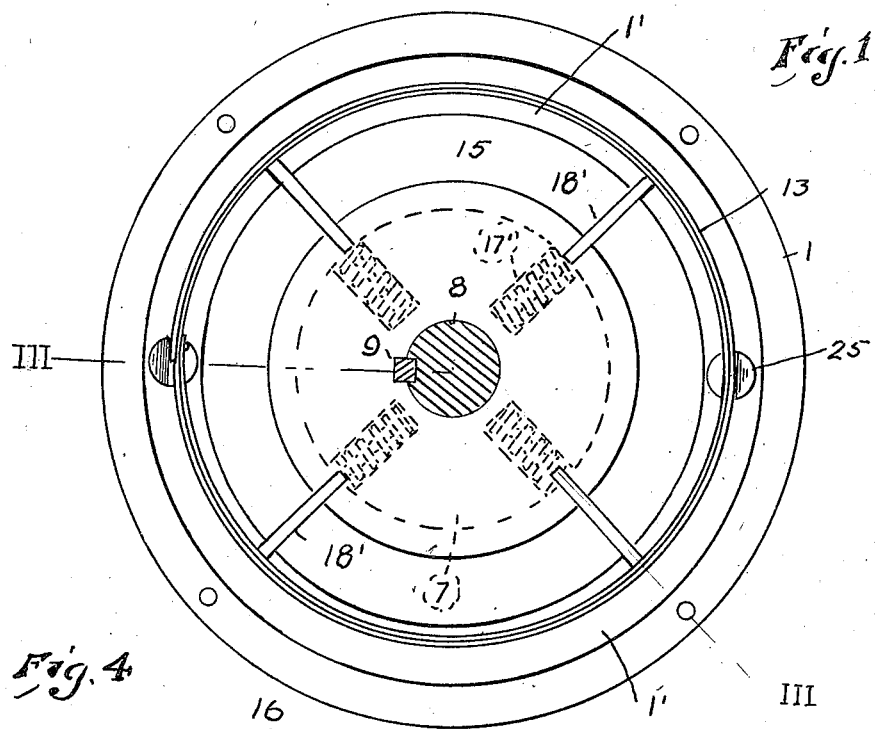
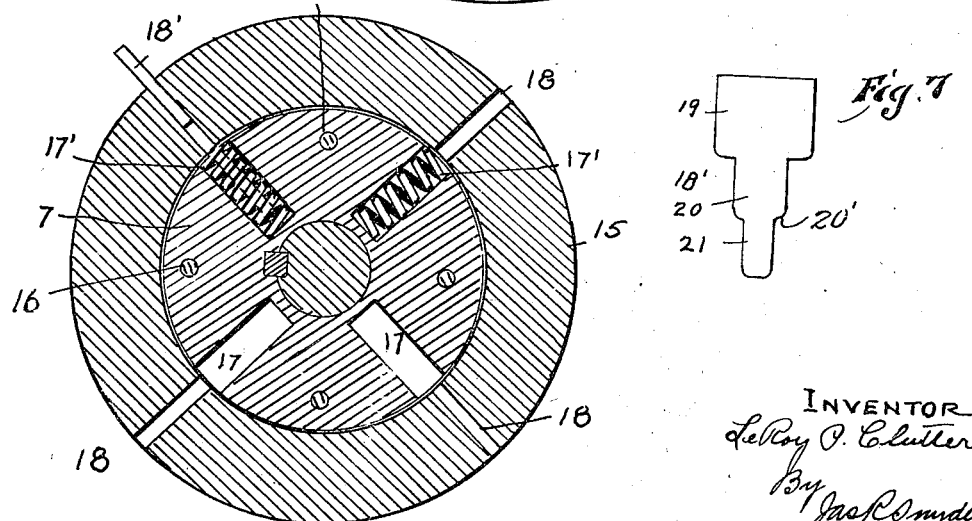
INVENTOR
LeRoy P. Clutter
By Jack Snyder
Attorney

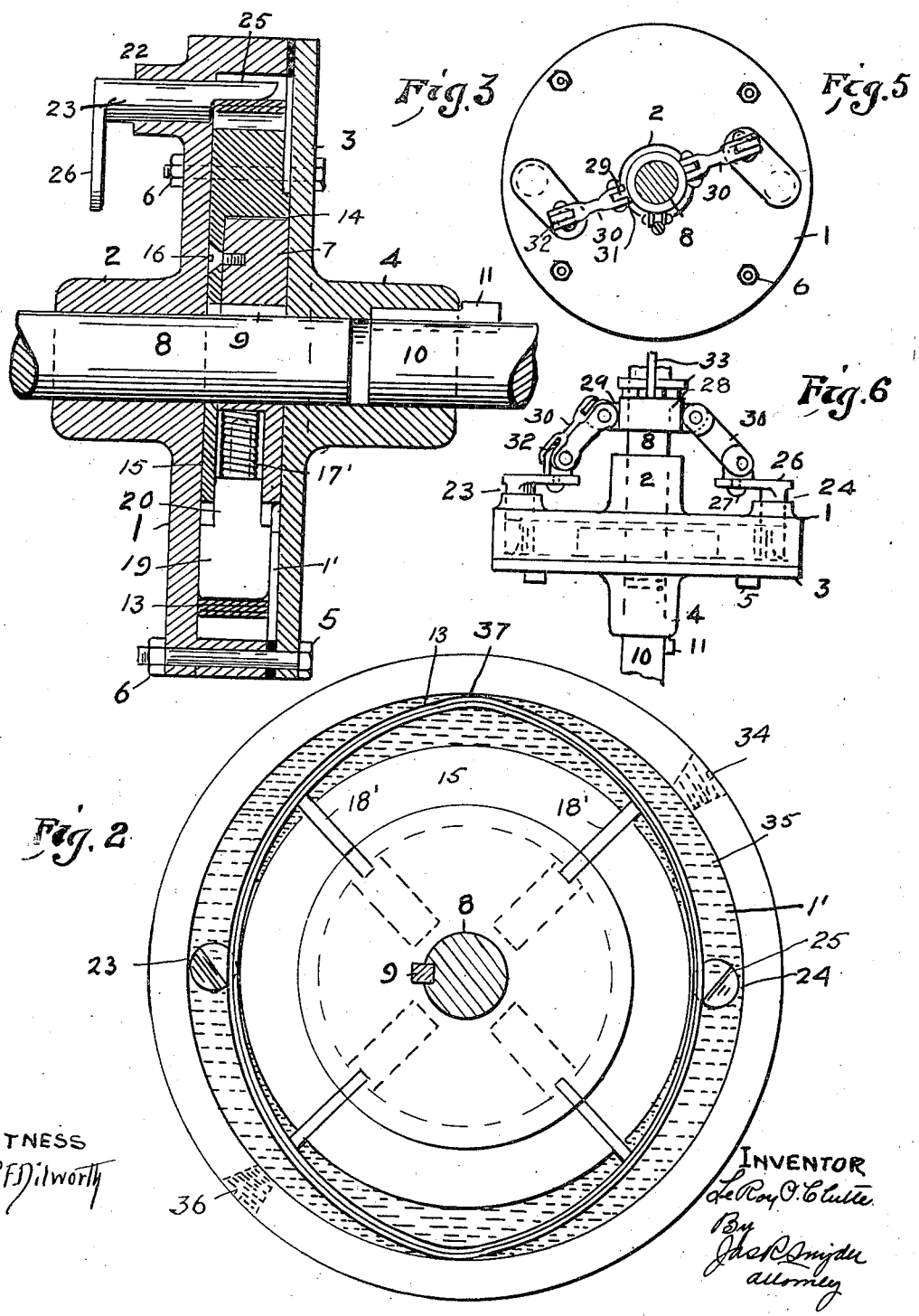

Patented May 1, 1923.

1,453,922

UNITED STATES PATENT OFFICE.

LE ROY P. CLUTTER, OF UNIONTOWN, PENNSYLVANIA.

COUPLING DEVICE.

Application filed February 5, 1921. Serial No. 442,613.

*To all whom it may concern:*

Be it known that I, LE ROY P. CLUTTER, a citizen of the United States, residing at Uniontown, in the county of Fayette and State of Pennsylvania, have invented certain new and useful Improvements in Coupling Devices, of which the following is a specification.

This invention relates to improvements in coupling devices, designed primarily for use as couplings, brakes, clutches, and the like, or for any purposes wherein it is found applicable, and the objects of the invention are to provide a device of the character described, in a manner as hereinafter set forth, which is lubricant operated, simple in its construction and arrangement, strong, durable and efficient in its use, positive in its action and operation, and comparatively inexpensive to manufacture.

To the accomplishment of these and such other objects as may hereinafter appear, the invention consists of the novel construction, combination, and arrangement of parts herein specifically described, and illustrated in the accompanying drawings wherein is shown an embodiment of the invention, but it is to be understood that the device shown is merly illustrative of what is now thought to be the best embodiment thereof, and that various changes in the form, proportions, and minor details of construction can be resorted to, without departing from the principle or sacrificing any of the advantages of the invention, which come within the scope of the claims hereunto appended.

In the drawings forming a portion of this specification and wherein like numerals of reference designate corresponding parts throughout the several views:

Figure 1 is an end view of the coupling device with the end plate removed therefrom.

Figure 2 is a similar view with the compression band in the operative position.

Figure 3 is a sectional view of the device on line III—III, Figure 1.

Figure 4 is a sectional end view of the disk element.

Figure 5 is an end view of the casing and associated parts.

Figure 6 is a vertical plan view of the device in accordance with this invention.

Figure 7 is a vertical side elevation of the gate element.

Referring in detail to the drawings 1 denotes a casing, circular in contour and open at one end, and integrally formed with a laterally projecting bearing 2 at the other end. An end plate 3, provided with a similar laterally projecting bearing 4, completely covers the open end of the casing 1, providing a chamber 1' within the casing 1. The end plate 3 is securely fixed to the casing 1 by means of the bolts 5 and the nuts 6. The bearing 2 is formed centrally of the casing 1 and is in alinement with the bearing 4 of the end plate 3.

Rotatably mounted in the casing chamber 1' is a disk element including a disk member 7, which is fixed adjacent to the inner end of the driven shaft 8 by means of the key 9. The shaft 8 is journaled for rotation in the casing bearing 2, and in the inner end of the end plate bearing 4. The engine or drive shaft 10 is keyed, as at 11, in the end plate bearing 4 and when operated rotates the end plate 3 and the casing 1 secured thereto.

The disk element further includes the circular disk plate 15 formed with a centrally disposed circular recess 14, in which the disk member 7 is fixedly, though detachably, mounted by means of the screws 16.

The plate 15 is of less diameter than the diameter of the casing chamber 1' and a resilient laminated annulus 13 is positioned therebetween. The diameter of the annulus 13 is approximately commensurate to the mean diameter of the plate 15 and the casing chamber 1'.

Radially disposed pockets 17 are formed in the periphery of the disk member 7, in each of which a coil spring 17' is loosely mounted. The pockets 17 are arranged at right angles with respect to each other. The plate 15 is provided with a plurality of radially disposed slots 18 extending from the disk member 7 to the periphery of the plate 15. Each of the slots 18 is in radial alinement with one of the pockets 17.

Slidably mounted in each of the slots 18 is a flat gate member 18' comprising the enlarged portion 19, the intermediate portion 20, and the stem 21. The enlarged portion 19 is commensurate in area to the area of the slot 18 in which it is adapted to operate. The stem 21 of the gate member 18' extends into the pocket 17 and is surrounded with the spring 17'. The width of the intermediate portion 20 permits of its entrance into the pocket 17 during the operation of the device and compresses the spring 17' by such entrance, due to the action of the shoulder 20' against the outer end of the spring 17'. The action of the spring 17' normally tends to force the gate member 18' against the inner face of the annulus 13.

Diametrically opposed with respect to each other and rotatably mounted, as at 22, adjacent to the periphery of the casing 1, is a pair of operating rods 23 and 24, each having its inner end extending into the casing chamber 1' and shaped to form a cam 25, which latter is adapted to engage the outer face of the resilient annulus 13. The rotation of the operating rods 23 and 24 causes the cams 25 to engage the annulus 13 and force the latter against the periphery of the disk plate 15, as is clearly shown in Figure 2 of the drawings.

A crank arm 26, provided with a pivoted connecting pin 27, is fixed to the projecting outer end of each of the operating rods 23 and 24. A grooved collar 28, formed with a pair of diametrically disposed lugs 29, is slidably mounted on the driven shaft 8. An angularly disposed toggle lever 30 is pivotally connected at one end, as at 31, with each of the lugs 29, and at the other end, as at 32, with respective crank arms 26 through the pins 27.

An operating rod 33 is provided for shifting the collar 28 and engages in the groove of the latter. When the collar 28 is shifted on the shaft 8 toward the casing 1, the toggle levers 30 and the crank arms 26 will operate to simultaneously actuate the operating rods 23 and 24, forcing the annulus 13 against the periphery of the disk plate 15 by the action of the cams 25 thereagainst.

The casing chamber 1' is packed with a lubricant 35 namely, heavy oils, grease, and the like, and the resilient annulus 13 is embedded in the same. A threaded aperture, provided with a plug 34, is formed in the casing 1 to permit of the packing of the chamber 1' with the lubricant 35 without requiring the removal of the end plate 3 from the casing 1. A threaded aperture, provided with a plug 36, is formed in the casing 1 at the diametrically opposed side of the casing 1 relative to the other threaded aperture for the purpose of draining the lubricant therefrom when desired.

In practice the operation of the coupling device is as follows: Shaft 10 with the casing 1 is rotating continuously. When in the inoperative position the disk element, carried by the shaft 8, does not rotate, and the annulus 13 is in the normal position with the gate members 18' extending an equal distance from the slots 18 in the disk plate 15, and engaging the inner face of the annulus 13. When the annulus 13 is forced against the periphery of the disk plate 15, as hereinbefore described, other portions of the said annulus 13 will be expanded toward the outer face of the chamber 1', as at 37. The annulus 13 is now substantially oval-shaped. The operation of the gate members 18' is such that they will engage the inner face of the annulus regardless of its contour. The gate member 18' passing along the expanded portion of the annulus will gather and shove ahead of it a quantity of the lubricant 35 which will be impacted against the depressed portion of the annulus forced against the periphery of the disk plate 15 intermediate of which the lubricant cannot pass and consequently the disk element will be carried around with the casing 1 and the coupling operation completed.

What I claim is:

1. A coupling device comprising a casing adapted to be connected with a prime mover, a driven disk element arranged within the casing having a plurality of radially disposed spring controlled gate members, a body of lubricant between the disk element and the casing, a laminated resilient annulus interposed between the disk element and the casing and embedded in the said lubricant, and a pair of oppositely disposed and simultaneously operating cams for forcing said annulus against the disk element at two points for causing a compacting of the lubricant whereby the disk element is operated from the casing.

2. A coupling device comprising a casing adapted to be connected with a prime mover, a driven disk element arranged within the casing having a plurality of radially disposed spring controlled gate members, a body of lubricant between the disk element and the casing, a resilient annulus interposed between the disk element and the casing and embedded in said lubricant, and a pair of simultaneously operable cams for shifting the annulus to impact at two points against the disk element causing thereby a compacting of the lubricant whereby the disk element is driven from the casing.

3. A coupling device comprising a driving element, a driven element, a body of fluid interposed between said elements, a laminated resilient annulus interposed between said elements in said fluid, and a pair of simultaneously operable cams for shifting the annulus to impact at two points against the driven element causing thereby a compacting of the fluid whereby the driven element is operated from the driving element.

In testimony whereof I affix my signature.

LE ROY P. CLUTTER.